COMPARATOR

Filed Nov. 19, 1958 3 Sheets-Sheet 1

INVENTOR
FRANK CHADURJIAN
BY Carl C. Kling
ATTORNEY

United States Patent Office 2,973,508
Patented Feb. 28, 1961

2,973,508

COMPARATOR

Frank Chadurjian, Peekskill, N.Y., assignor to International Business Machines Corporation, New York, N.Y., a corporation of New York Filed Nov. 19, 1958, Ser. No. 774,859

8 Claims. (Cl. 340—174)

This invention relates to electronic comparators and particularly to a device for concurrently comparing a given test word with a plurality of words previously stored in a magnetic core matrix memory.

Magnetic core matrix memories are extensively employed as storage devices in electronic computing machines. It is common, in operation of a computer, to store a quantity of data in binary or other form in the memory, by placing some of the cores at one magnetic level, and other cores at other distinct magnetic levels. The combinations of cores at various magnetic levels are recognizable by the computer and representative of data.

In a typical machine, using binary storage elements, the cores in a matrix are composed of an alloy having a substantially rectangular hysteresis loop, each core being capable of retaining either of two opposite magnetic remanence states indefinitely unless switched to the other by a current along the wires passing through the matrix. The opposite remanence states conventionally employed for representing binary information are arbitrarily designated as 0 and 1. With a 0 stored, a pulse applied to a winding linking the core in proper sense causes the loop to be traversed, switching the core to 1. The remanence state 1 is retained after the pulse terminates. Such a pulse is a "write" pulse. Similarly, the core is read out or returned to the 0 state in determining what information has been stored by applying a pulse in reverse sense to the same or another winding. Such a pulse is a "read" pulse. Should a 1 have been stored, a large flux change occurs with the shift from the 1 to 0 conditions with a corresponding voltage magnitude developed on an output winding. On the other hand, should a 0 have been stored, little flux change occurs and negligible signal is developed on the output winding.

The cores may all be set to the magnetic state representing the binary 0. Selective passage of current through the core driver wires then switches the desired pattern of cores to the 1 state. This switching may be accomplished by coincidence of current along two wires intersecting at the selected core, each wire carrying half-select current, or half of the current necessary to induce magnetism sufficient to switch the core. Once the core matrix memory is loaded with data, the data remains until destroyed or replaced.

In certain machine operations it may be desirable to test a large section of the memory to determine whether a particular data word is contained in the memory, and if so, how many times and precisely where the data word appears. Accordingly, the principal object of this invention is to provide a method and means for simultaneously testing a plurality of words in a core matrix memory with the test word, and indicating the occurrence and whereabouts of the test word if contained in the memory.

Another object of one embodiment of the invention is to provide means for repetitively sampling the words in the memory, for coincidence with the test word, without destroying the data stored in the memory.

The invention tests each bit of each of a plurality of memory words in a section of the core matrix, for match or mismatch with the corresponding order bit of the test word, by means of a test pulse controlled by the value of the test word bit. Any mismatch of the memory word bit with the test pulse causes a signal to be generated to indicate the result of the comparison of the particular bit. All the bits of a particular memory word are traversed by a sense line, which terminates in an output device for signalling equality or inequality of the memory word to the test word.

Other objects of the invention will be pointed out in the following description and claims and illustrated in the accompanying drawings, which disclose, by way of example, the principle of the invention and the best mode which has been contemplated of applying that principle.

In the drawings:

Fig. 1 is a partially schematic block diagram of an embodiment of the invention.

Figs. 2 and 3 are block diagrams of the device of Fig. 1 during two distinct steps of operation, the read 0 step and the read 1 step.

*Reset readout embodiment*

Figure 1:
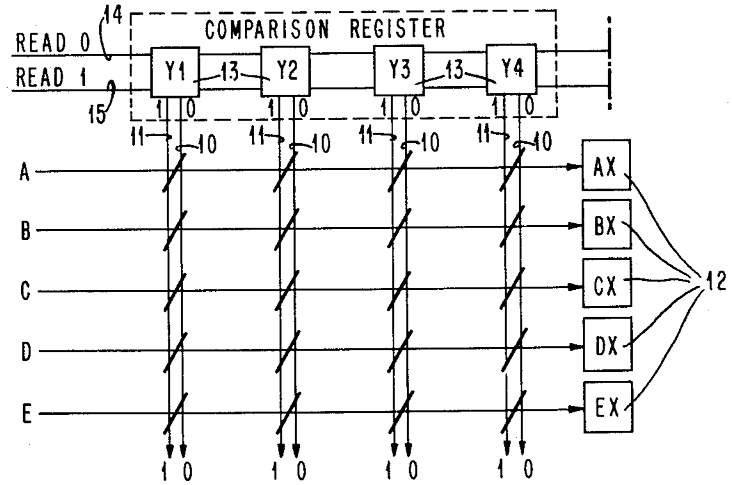
Figure 5:
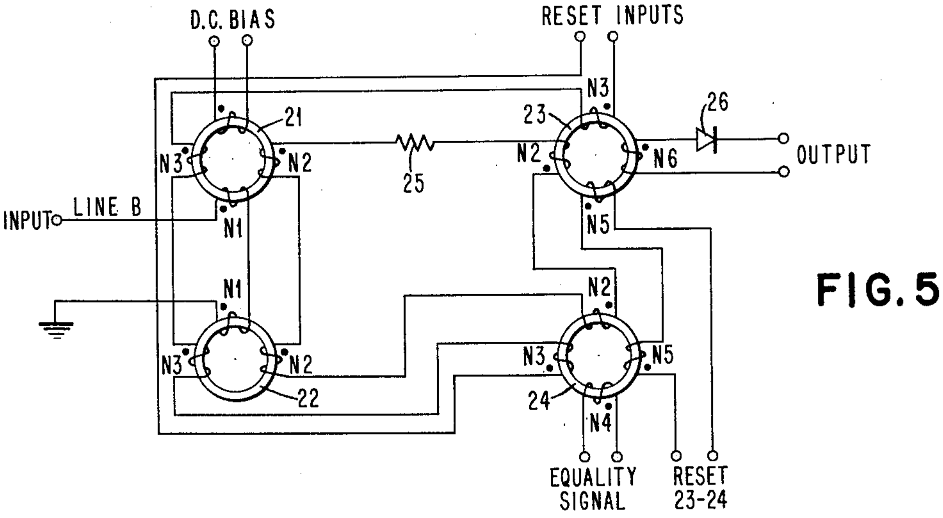
Fig. 5 is a schematic diagram of a preferred form of equality signalling device of Fig. 1.

In Fig. 1, a core matrix is pictured schematically, showing twenty cores in four vertical columns Y1–Y4 and five horizontal rows AX–EX. Each core is provided with a sense line A, B, C, D or E, and with a pair of interrogate lines 10 and 11, and is identifiable by its coordinates A1, C3, etc. Each sense line terminates in an equality signalling device 12 (AX–EX in Fig. 1), a preferred type of which is illustrated in Fig. 5, which will be explained in the section headed "Equality signalling devices." Each equality signalling device AX–EX is adapted to produce a signal in response to a core flip, i.e., a change by any of its associated cores from one magnetic state to another.

For example, if core A1, in the 0 magnetic state, is caused to flip to the 1 state, a voltage is induced onto sense line A, which triggers an output from equality signalling device AX. (While the core matrix memory is being loaded with data, it may be desirable to open the circuits of the equality signalling devices to avoid spurious signals.)

The core matrix memory may be loaded with data according to standard methods by means not shown, or by utilizing the sense and interrogate lines for loading the cores. The memory may contain a variety of words, all of which are to be compared with a test word. The test word is entered into comparison register Y1–Y4 in any well known manner. Each stage of the comparison register then contains a bit of data, which in a binary machine is either a 0 or a 1. A suitable structure of a comparison register stage 13, illustrated in Fig. 4, will be more particularly described in the section headed "Comparison register stages."

All comparison register stages are equipped with means to interrogate for 0's at a particular time all the cores in the column associated with the stage, if the stage is set at 0, and with means to interrogate the same cores for 1's at a slightly different time, if the stage is set at 1.

These means may include the read 0 and read 1 lines 14, 15 and the interrogate lines 10, 11.

*Operation*

Figure 6:
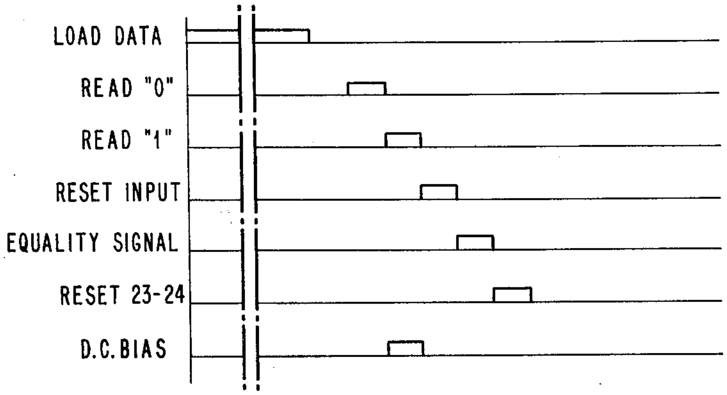
Fig. 6 is a timing chart for the embodiment of Figs. 1–5.

In operation, the core matrix memory is assumed to be loaded with a variety of words. The comparison register is loaded with a test word; all equality signalling devices are reset to "equal." The sequence of operation is shown in timing chart Fig. 6.

Figure 2:
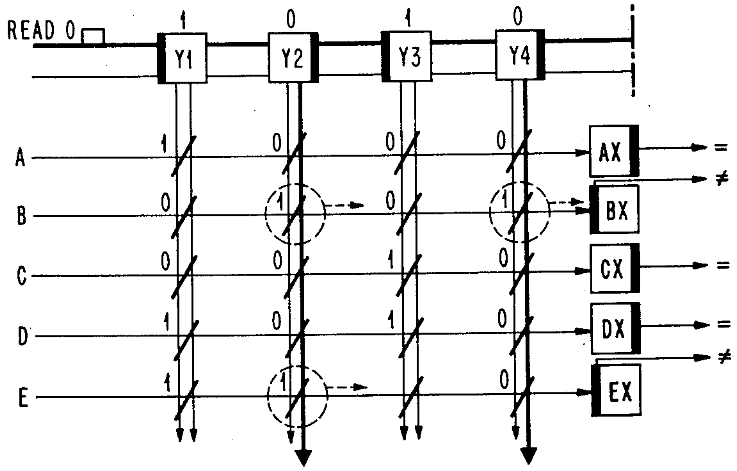

The following words may be in the core matrix memory, for example, as shown in Fig. 2.

| | | | | |
|---|---|---|---|---|
| (A) | 1 | 0 | 0 | 0 |
| (B) | 0 | 1 | 0 | 1 |
| (C) | 0 | 0 | 1 | 0 |
| (D) | 1 | 0 | 1 | 0 |
| (E) | 1 | 1 | 0 | 0 |

After the test word has been set up, all comparison register positions containing 0's are read out onto the 0 interrogate lines 10. If the test word is the binary ten, 1010, as in Fig. 2, stages Y2 and Y4 contain 0's and their 0 interrogate lines are pulsed at read 0 time as shown by a heavy black line in Fig. 2. Stages Y1 and Y3 are unaffected since they do not contain 0's.

Word D is equal to the test word and is the object of the search. The 0 interrogate lines associated with stages Y2 and Y4 are pulsed with current of the polarity required to switch cores to 0. Cores A2 and A4 are already at 0 and are unaffected, being merely held at saturation. Cores A2 and A4 experience no change in magnetic state and induce no output along sense line A. Equality signalling device AX remains on the equality side. Cores B2 and B4, however, are both at magnetic state 1. They are switched to 0, and undergo such change of flux that each engenders an output onto sense line B, as indicated by a circle and arrow in Fig. 2. Either output is sufficient ot drive equality signalling device BX to the unequal side.

Cores along sense lines C and D match 0's in the test word; CX and DX remain on the equal side. Core E2 is a mismatch, and is flipped to drive EX to its unequal side. At the end of the read 0 step, words B and E have been detected to be unequal, but words A, C and D are still considered to be equal to the test word.

Figure 3:
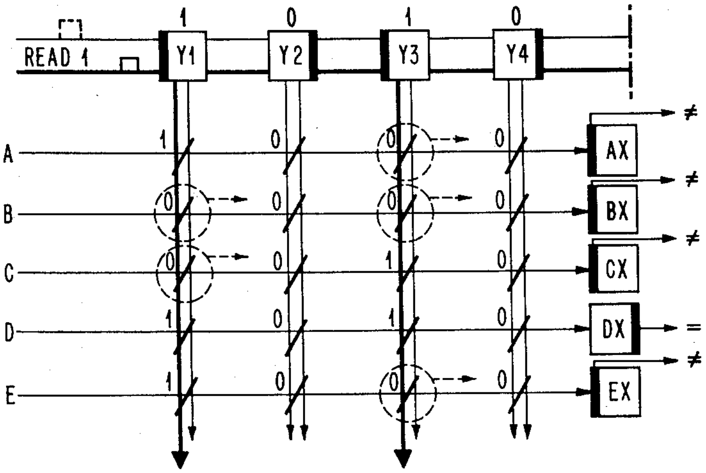

The next step is the read 1 step (shown in Fig. 3). Those comparison register stages containing 1's are read out onto their associated 1 interrogate lines 11, in the form of interrogation pulses of current of polarity and magnitude sufficient to switch all cores along the pulsed interrogate lines to 1. The 1 interrogate lines associated with Y1 and Y3 are pulsed. Cores A3, B1, B3, C1 and E3 are switched from the 0 state to magnetic state 1, and because of the changes of magnetism induce currents along sense lines A, B, C and E. Words B and E had previously been detected as containing a 0 mismatch with the test word; BX and EX remain on the unequal side. AX and CX are driven to the unequal side.

At this time, all unequal words A, B, C and E have been detected. D is the only word that is not unequal, and therefore, D is equal to the test word. DX signals equality of D to the test word.

For subsequent comparisons, the equality signalling devices are reset to equal, and the data in the memory, which was altered by the interrogation, is replaced or regenerated. For use with core memories using ternary or other multi-state magnetic elements, the invention operates in the same manner. Each memory element is interrogated for the bit value appearing in the corresponding stage of the comparison register; a mismatch disables the associated equality signalling device, and equal words are found by striking out all possible unequal words.

*Comparison register stages*

Figure 4:
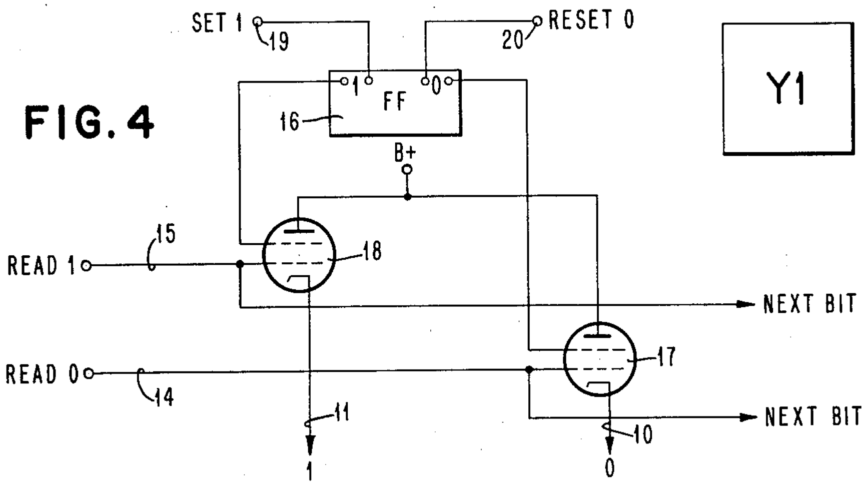
Fig. 4 is a schematic diagram of a suitable construction of a stage of the comparison register of Fig. 1.

Fig. 4 illustrates a suitable construction of a stage 13 of the comparison register for a binary machine. The function of each stage is to accept a bit of the test word, and to pass test pulses to the memory cores in accordance with the value of the bit. Data is stored in the register flip-flop 16, which may be any commercially available flip-flop or the like capable of storing and reading out a binary bit. Read 0 line 14 operates the control grid of switching tube 17, and read 1 line 15 operates the control grid of switching tube 18. The screen grids of tetrodes 17 and 18 are connected to the 0 and 1 sides, respectively, of trigger 16, which causes one tube of the pair to be inactivated by a negative bias potential on the screen grid.

The comparison register stage is set to 1 by an impulse along line 19, or reset to 0 by an impulse along line 20. If the stage shown in Fig. 4 should be set to 1, operation will be as follows:

At read 0 time, line 14 will be raised to a more positive potential, activating the control grid of tube 17. Tube 17 will not conduct, however, because of the negative bias on its screen grid. Tube 18 is unaffected during read 0 time.

At read 1 time, line 15 will be raised to a more positive potential, activating the control grid of tube 18. The screen grid of 18 is positively biased by trigger 16 which is in the 1 state. Tube 18 conducts, energizing line 11, which interrogates all its associated cores for 1's. Line 10 is wound through cores to switch them to 0; line 11 switches its cores to 1.

As already explained, at read 0 time of the cycle (see Figs. 4, 6), all those stages of the comparison register which contain 0's are read out, causing associated cores containing 1's to engender outputs in their sense lines, A, B, C, D or E.

*Equality signalling devices*

In the example illustrated by Fig. 2, sense line B realizes a positive pulse from a 0 mismatch, i.e., a core containing a 1 in a position corresponding to a 0 in the comparison register. Polarities are merely illustrative, and are given for ease in understanding operation of the components making up the inventive combination. The positive pulse is carried along sense line B to an equality signalling output device BX, which is adapted to accept either a positive or a negative input pulse (from either a 0 mismatch or a 1 mismatch) and, in response to either or both mismatch pulses to inhibit its normal output pulse (equality signal).

Fig. 5 is a schematic diagram of a preferred equality signalling device BX (12) of Fig. 1. BX contains four magnetic cores—two input coupling cores 21—22, an output core 23, and a switch core 24. The input coupling cores are oppositely wound so that core 21 is switched to 1 by the 0 mismatch pulse (positive polarity), and core 22 is switched to 1 by the 1 mismatch pulse (negative polarity). Each of the two input coupling cores is connected to the switch core 24 in such manner that the switch core accepts a 1 through whichever of the input coupling cores that is being switched to 1. The switch core in turn controls output core 23.

In accordance with the "dot" convention, a dot marking is shown adjacent one winding terminal of each of the windings shown in Fig. 5. This indicates the winding direction in that a positive pulse directed into the dotted end tends to apply a negative field or store a 1, termed a "write" pulse, while a positive pulse into the unmarked end tends to store a 0, termed a "read" pulse. The voltage induced at the dot end of any winding on a core during the flip (flux change) is of the same polarity as the voltage at the dot end of the winding causing the flip. In Fig. 5, a positive pulse into the dot writes a 1; the flip throws positive pulses out of all other dots on the same core.

Both input coupling cores 21 and 22 are saturated at the 0 state, having been reset during the preceding cycle. The 0 mismatch pulse drives core 22 further into 0 saturation. The impedance of core 22's N1 winding is therefore very low; current builds up in line B to a value sufficient to switch core 21 to 1. This flip induces a current in the N2 winding loop of cores 21–24, causing clockwise loop current to flow in the N2 loop to read cores 22 and 23 and write core 24. Since cores 22 and 23 are saturated at the 0 state, they are driven further into saturation and present negligible impedance, which allows sufficient current to flow to switch core 24 to the 1 state.

At read 1 time (see timing chart, Fig. 6 and Fig. 3), line B realizes a negative pulse caused by a 1 mismatch. This pulse reads core 21 and writes core 22. Core 21 is, however, biased in the 1 state during read 1 time, to prevent switching. Core 22 is switched to 1, the flip causing a current to be induced in the N2 winding loop of cores 21–24. This loop current is of polarity to read cores 21 and 23 and write core 24.

Had no 0 mismatch occurred, as in word C of Fig. 2, the same result would have followed. Core 21 would have presented a low impedance to the 1 mismatch pulse, allowing sufficient current to flow in line B to switch core 22 to 1. The flip of core 22 would have induced current in the N2 winding loop to write core 24.

After the steps read 0 and read 1 are completed, core 24 retains a 1 if the associated word contained either a 1 or 0 mismatch with the test word; a 0 if there was no mismatch.

At Reset Inputs time, input coupling cores 21–22 are reset (Fig. 6) by a current through their N3 windings. In any circuit for line A–E in which a mismatch was detected, i.e., one of the input coupling cores is set at 1, reset of an input coupling core induces a current in the N2 winding loop, which tends to write output core 23 and read switch core 24. But cores 23 and 24 are biased at this time by winding N3 to prevent switching; the current is dissipated in resistor 25.

At Equality Signal time, switch core 24 is pulsed toward 1 by a current through its N4 winding. Thus, for all words in which an output was realized to write switch core 24, no change occurs, since core 24 is merely driven further into 1 saturation. In the equality signalling device associated with sense line D, where no output occurred and the switch core 24 contains a 0, the switch core is flipped to 1. This flip induces a current in the N2 loop to write output core 23, and thereby induce a current of polarity passed by diode 26 to signal equality. Core 21 is negatively biased at this time.

At Reset 23–24 time, cores 23 and 24 are reset by a current through the N5 winding loop; the induced N2 loop currents buck and cancel because of the opposite polarities of the N2 windings. Reset of an output core containing a 1 tends to induce current in output winding N6, but diode 26 is in blocking relationship.

*Résumé of the invention in operation*

The data is assumed to be in the memory, as shown in Figs. 2 and 3. The test word is assumed to be set up in the triggers of the comparison register. At read 0 time, the read 0 pulse along the read 0 line, together with the output from the register triggers of stages Y2 and Y4, conditions the grids of the 0 driver tubes 17 to conduct. While conducting, the driver tubes carry current along the 0 interrogate lines 10 sufficient to switch all the associated cores to 0. Cores B2, B4, and E2 flip, inducing positive pulses on sense lines B and E. These positive pulses write positive input coupling cores 21 in equality signalling devices BX and EX; the flips of the input coupling cores write switch cores 24 in BX and EX.

At read 1 time, the read 1 pulse along the read 1 line, together with the output from the register triggers of stages Y1 and Y3, conditions the grids of the 1 driver tubes 18 to conduct. While conducting, the driver tubes carry current along the 1 interrogate lines 11 to switch all the associated cores to 1. Cores A3, B1, B3, C1, and E3 flip, inducing negative pulses on sense lines A, B, C and E. These negative pulses write negative input coupling cores 22 in equality signalling devices AX, BX, CX and EX; the flip of the input coupling cores induces currents which write switch cores 24 in the four equality signalling devices.

At the end of the read 1 step, the input coupling cores are reset.

At signal time, all switch cores are pulsed toward 1. Thus, for words A, B, C, and E, where mismatch pulses wrote switch cores 24, the switch cores are merely driven further into 1 saturation. In the equality signalling device DX, which previously received no pulse to write the switch core, the switch core flips to 1, and induces a current in its N2 winding loop to write its output core 23, and thereby induce an output pulse of positive polarity, which is passed by diode 26 for the desired output. Word D is found to be the equal of the test word, because it survives the two tests by which all unequals are eliminated.

*Non-destructive readout embodiment*

A second embodiment (Fig. 7) of the invention employs a non-destructive readout exclusive OR (XOR) circuit for each bit of the words in the core memory, each XOR having an *i* core associated with a bit in the memory word, and a *p* core associated with the equal order bit of the test word. The XOR is set up at a setup time during which the *i* core is impulsed according to the memory word bit and the *p* core is simultaneously impulsed according to the test word bit of equal order. After setup the XOR is sampled with a sample pulse, which it gates according to its exclusive OR logic. If the *i* and *p* cores were both set up by 0's, the sample pulse cannot pass; if both cores were set up by 1's, the sample pulse cannot pass. Only those XOR elements containing mismatched *i* and *p* cores allow the sample pulse to pass. Since the XOR bit storage element is not reset by the sample pulse, the XOR may be repetitively sampled according to the needs of the computer.

Figure 7:
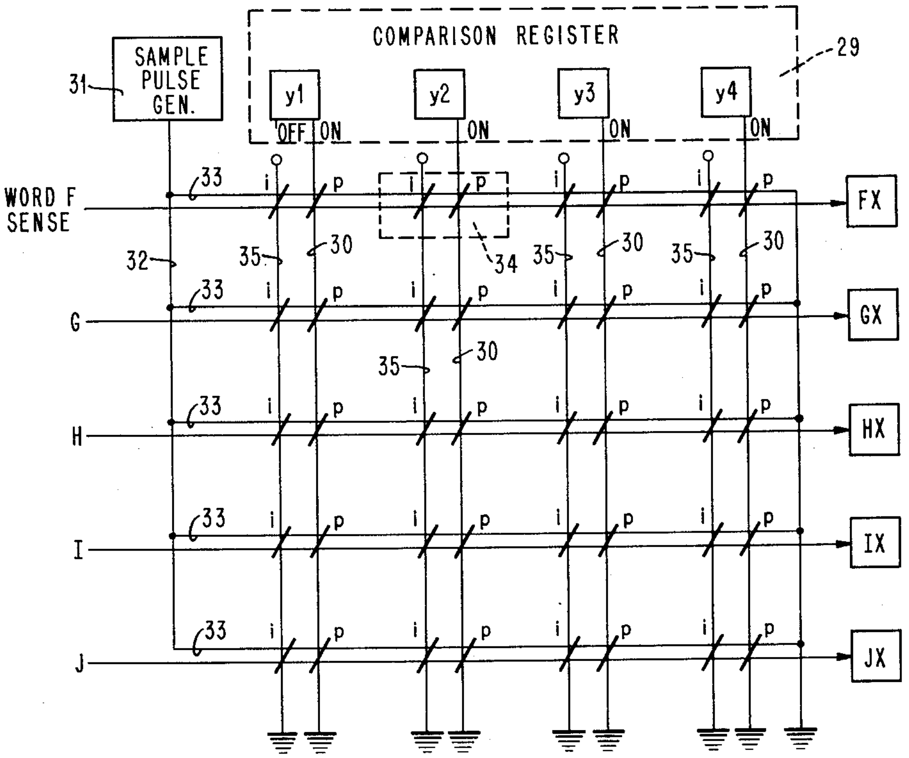
Fig. 7 is a schematic diagram of an embodiment of the invention in which the data in memory is not destroyed during interrogration.
Figure 8:
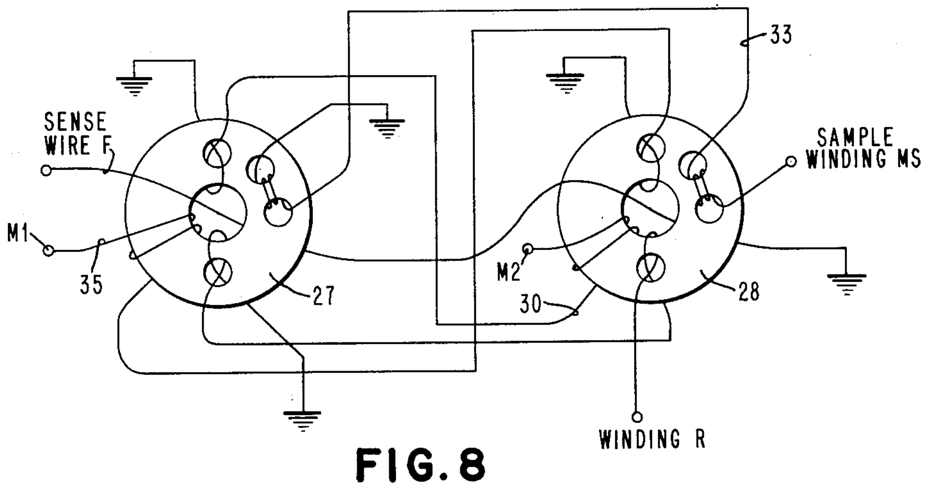
Fig. 8 is a diagram of a suitable exclusive OR storage element shown within broken lines in Fig. 7.

Fig. 8 is a diagram of a suitable XOR non-destructive readout circuit, which is not in itself a part of the invention. Winding M1 of core 27 controls its information input while winding M2 of core 28 controls the input to core 28. The windings are such that, when the cores are sampled by a pulse on sample winding MS, if both cores were similarly set up there will be no output induced in sense wire F by cores 27 and 28 when the sample pulse is applied, because of the bucking relationship of the two cores. The data bit is entered into core 27 (Fig. 8), designated *i* in Fig. 7—the test bit is loaded into core 28, designated *p* in Fig. 7.

The comparison register 29 requires only binary devices which are either "on" or "off," such as the circuit of Fig. 4 with tube 17 omitted. Fig. 7 shows the "on" side arranged to designate a 1. All cores 28 (Fig. 8), designated *p* in Fig. 7, must be set to 0 before the test word is placed in the comparison register. The M2 winding of each *p* core is connected directly to the 1 or "on" side of its associated comparison register stage *y* by wire 30.

Operation is as follows:

The *p* cores are reset to 0.

The bits making up the test word are read into the comparison register stages 29. Stages *y*1–*y*4 are set to "on" or "off" to represent the various bits of the test word.

At setup time, certain *y* stages turn "on," under control of 1's in the stages, driving all *p* cores along associated lines 30 toward 1. Thus, *p* cores are set to match the test word in the comparison register. Simultaneously, the *i* cores associated with 1 bits in the memory word are driven toward 1.

After setup time, a sample pulse from generator 31 is fed to each core along lines 32—33, to test each bit storage element for a mismatch. Any two paired cores 27—28 which mismatch cause a pulse to be induced in the associated word sense line F–J. If paired cores match no output will be noted.

Any output along sense line F–J switches equality signalling device FX–JX to unequal, in the same manner as the first embodiment. The equality signalling device may be any suitable inverter whose function is to emit an output only if no input is realized, such as the circuit in Fig. 5, in which core 22 may be omitted.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In an electronic comparing device for simultaneously comparing a plurality of memory words with a test word, a magnetic core matrix memory made up of bit columns and word rows of bit storage elements, each of which exhibits plural states of magnetic stability; means to set said rows of bit storage elements to magnetic states representing respective words of data; a plurality of equality signalling devices, each associated with a memory word to be compared; a plurality of word sense lines each traversing the bit storage elements for a particular word and terminating in the associated equality signalling device; a comparison register having a plurality of stages for accepting respective bits of the test word; each stage associated with a column of bit storage elements, and means for generating interrogation pulses in accordance with data in the various positions of the comparison register, along associated columns of bit storage elements, whereby each bit storage element containing a mismatch with the related comparison register stage is conditioned to emit a pulse along the associated word sense line to inhibit the associated equality signalling device, equality being determined by eliminating unequals.

2. A multiple electronic comparing device for simultaneously comparing a plurality of memory words with a test word, comprising: a comparison register; a magnetic core matrix having bit storage elements arranged in bit order columns and word rows; columnar lines, each respectively related to a particular bit order, associated with a bit storage element in said comparison register and traversing the corresponding order bit storage element of each memory word; word sense lines traversing the word rows of bit storage elements, each word sense line being related to a particular word row; and means controlled by the values of the particular bits in the comparison register and by respectively different values of the corresponding order bit storage elements in the memory for generating mismatch pulses along word sense lines traversing said bit storage elements.

3. A device according to claim 2, comprising a plurality of equality signalling devices connected respectively to each word sense line, each of said equality signalling devices comprising normally operable equality signalling means, and inhibiting means controlled by a mismatch pulse along the associated word sense line for inhibiting the associated equality signalling means.

4. A device according to claim 3, wherein said equality signalling means comprises an output core, an output winding on said output core, a switch core coupled to said output core, and signal means for generating a timed output signal driving pulse, said signal means being coupled to said switch core; and wherein said inhibiting means comprises input coupling means for switching said switch core at a time prior to the signal driving pulse, whereby said signal driving pulse is short circuited through the switch core to inhibit the normal driving function of the signal driving pulse, through the switch core to the output core.

5. A device according to claim 4 wherein said bit storage elements are single cores for each bit in storage, and the mismatch pulses therefore can be either negative or positive, and said equality signalling device may receive either positive or negative mismatch pulse inputs, or both sequentially, input coupling means for said equality signalling device comprising a positive input coupling core and a negative input coupling core, and a common input winding oppositely wound on the two input coupling cores.

6. A device according to claim 5 wherein said input coupling means further comprises means to bias the earlier pulsed of said input coupling cores, to prevent malfunction when both positive and negative mismatch pulses arrive sequentially, whereby said earlier pulsed input coupling core is prevented from switching back under the influence of the later pulse.

7. A device for detecting the presence and location of a particular word in a magnetic core matrix memory made up of rectangular hysteresis loop magnetic cores arranged in bit columns and word rows, comprising: a plurality of equality signalling devices, one for each word to be interrogated, normally conditioned to indicate equality; a plurality of word sense lines each traversing the row of cores representing a word in storage, and terminating in an associated equality signalling device; a comparison register having a plurality of stages for accepting the bits of the test word; means responsive to the presence of a first bit value in comparison register stages for reading out the stages along associated columns of cores, whereby cores containing said first bit value are unaffected, while cores containing a second bit value flip, inducing currents in the associated word sense lines to disable the associated equality signalling devices; and means responsive to the presence of a second bit value in comparison register stages for reading out the stage along associated columns of cores, whereby cores containing said second bit value are unaffected, while cores containing the first bit value flip, inducing current in the associated word sense lines to disable the associated equality signalling devices; whereby equality of the words in storage to the test word is detected by elimination of all possible unequal words, such equality being signalled by equality signalling devices not disabled.

8. A device for storing data and for detecting equality of a particular data word with a test word, comprising: a plurality of exclusive OR bit storage elements each having a storage core and a testing core, said bit storage elements being arranged in bit columns and word rows; a comparison register having a plurality of stages for respective bits of a test word; first setup means responsive to the presence of a first bit value in said comparison register stages for driving said testing cores toward said first bit value; second setup means to drive certain of said storage cores toward said first bit value, in accordance with data words to be compared with the test word; a plurality of equality signalling devices, associated respectively with word rows of cores, normally indicating equality; word sensing means traversing each row of bit storage elements for connecting said bit storage elements to the associated equality signalling device; a source of sample pulses; and means connected to said source for applying said sample pulses to each word row of storage elements in parallel, whereby said exclusive OR storage elements induce currents along said word sensing means, in response to a mismatch in paired cores, to disable the associated equality signalling device; the disabling of all equality signalling devices representing unequals resulting in an equality signal remaining for the equal word only.

References Cited in the file of this patent

UNITED STATES PATENTS

| | | |
|---|---|---|
| 2,691,152 | Stuart-Williams | Oct. 5, 1954 |
| 2,691,153 | Rajchman et al. | Oct. 5, 1954 |
| 2,768,367 | Rajchman | Oct. 23, 1956 |
| 2,834,894 | Steagall | May 13, 1958 |
| 2,854,586 | Eckert | Sept. 30, 1958 |